(12) United States Patent
Wolford

(10) Patent No.: US 8,627,109 B2
(45) Date of Patent: Jan. 7, 2014

(54) METHOD OF SECURING ACCESS TO A HARD DISK DRIVE OF A COMPUTER SYSTEM WITH AN ENHANCED SECURITY MODE

(75) Inventor: Jeff W. Wolford, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2395 days.

(21) Appl. No.: 11/396,848

(22) Filed: Apr. 3, 2006

(65) Prior Publication Data

US 2007/0118768 A1 May 24, 2007

Related U.S. Application Data

(60) Provisional application No. 60/739,858, filed on Nov. 23, 2005.

(51) Int. Cl.
*G06F 11/30* (2006.01)
*G06F 12/14* (2006.01)

(52) U.S. Cl.
USPC .......................................................... 713/193

(58) Field of Classification Search
USPC ......................................................... 713/193
See application file for complete search history.

(56) References Cited

U.S. PATENT DOCUMENTS

| | | | | |
|---|---|---|---|---|
| 5,432,950 A | * | 7/1995 | Sibigtroth | 711/163 |
| 6,467,007 B1 | | 10/2002 | Armstrong et al. | |
| 6,957,335 B2 | * | 10/2005 | Foster et al. | 713/171 |
| 7,237,081 B2 | * | 6/2007 | Dahan et al. | 711/163 |
| 7,340,576 B1 | * | 3/2008 | Therene et al. | 711/164 |
| 7,356,707 B2 | * | 4/2008 | Foster et al. | 713/189 |
| 2003/0140205 A1 | | 7/2003 | Dahan et al. | |
| 2004/0088559 A1 | * | 5/2004 | Foster et al. | 713/193 |
| 2004/0236874 A1 | | 11/2004 | Largman et al. | |
| 2005/0193220 A1 | * | 9/2005 | Little et al. | 713/201 |
| 2006/0129848 A1 | * | 6/2006 | Paksoy et al. | 713/193 |
| 2006/0184804 A1 | * | 8/2006 | Varma et al. | 713/193 |
| 2007/0045425 A1 | | 3/2007 | Yoshida | |
| 2007/0118768 A1 | | 5/2007 | Wolford | |

\* cited by examiner

*Primary Examiner* — Kambiz Zand
*Assistant Examiner* — Stephen Sanders

(57) ABSTRACT

A method of enhancing security of a storage component communicating with a host processor over a bus comprises: receiving from the bus by the storage component one of a security unlock command, set password command, security disable command and security erase command along with a password associated therewith; determining a security state in which the storage component is operating at reception of the received command; determining if an enhanced security mode is enabled at reception of the received command; and performing security steps of the received command based the determined security state and the determined security mode.

20 Claims, 13 Drawing Sheets

METHOD OF SECURING ACCESS TO A HARD DISK DRIVE OF A COMPUTER SYSTEM WITH AN ENHANCED SECURITY MODE

This application claims the benefit of U.S. Provisional Application No. 60/739,858, filed Nov. 23, 2005, and entitled "Security Improvements for ATA HD Drives".

CROSS REFERENCE TO RELATED PENDING APPLICATION

U.S. patent application Ser. No. 11/396,534, entitled-"Method of Securing Access to a Hard Disk Drive of a Computer System", assigned to the same assignee as the instant application and filed currently therewith.

BACKGROUND

Computer systems generally include a mass storage component, like a hard disk drive (HDD), for example, to store the operational and application software of one or more host processing units. IBM's AT bus has become a defacto standard for linking the host processing unit with the HDD and for providing the protocol for communication therebetween. AT is a trademark of the IBM Corporation. Specifications for such linking and communication over the AT bus are currently provided by the ANSI standard published as NCITS 397-2005 AT Attachment-7 and AT Attachment-7 With Packet Interface (ATA/ATAPI-7), Vol. 1,which is incorporated herein by reference in its entirety. These specifications may be located over the world wide web at the website "www.incits.org". A security mode feature is included in the AT bus protocol standard, substantially in Section 4.7 thereof, which is intended to prevent unintended user access or unintended software, like a rogue or virus software, for example, which may have penetrated the host computer's defenses, from locking out the user from accessing software from the HDD.

Section 4.7 of the ATA/ATAPI-7 specification sets forth a password system for restricting access to user software stored on the HDD. In this standard, various predetermined commands issued by the host processing unit or elements thereof permit setting a password and accessing the drive storage with the password. However, the standard has certain drawbacks, which will be described in greater detail below, which may permit the password to be scrambled or changed, under certain conditions, by unintended software, thus locking out the USER from accessing the mass storage component.

SUMMARY

In accordance with one aspect of the present invention, a method of enhancing security of a storage component communicating with a host processor over a bus comprises: receiving from the bus by the storage component one of a security unlock command, set password command, security disable command and security erase command along with a password associated therewith; determining a security state in which the storage component is operating at reception of the received command; determining if an enhanced security mode is enabled at reception of the received command; and performing security steps of the received command based the determined security state and the determined security mode.

DETAILED DESCRIPTION OF THE INVENTION

Figure 1:
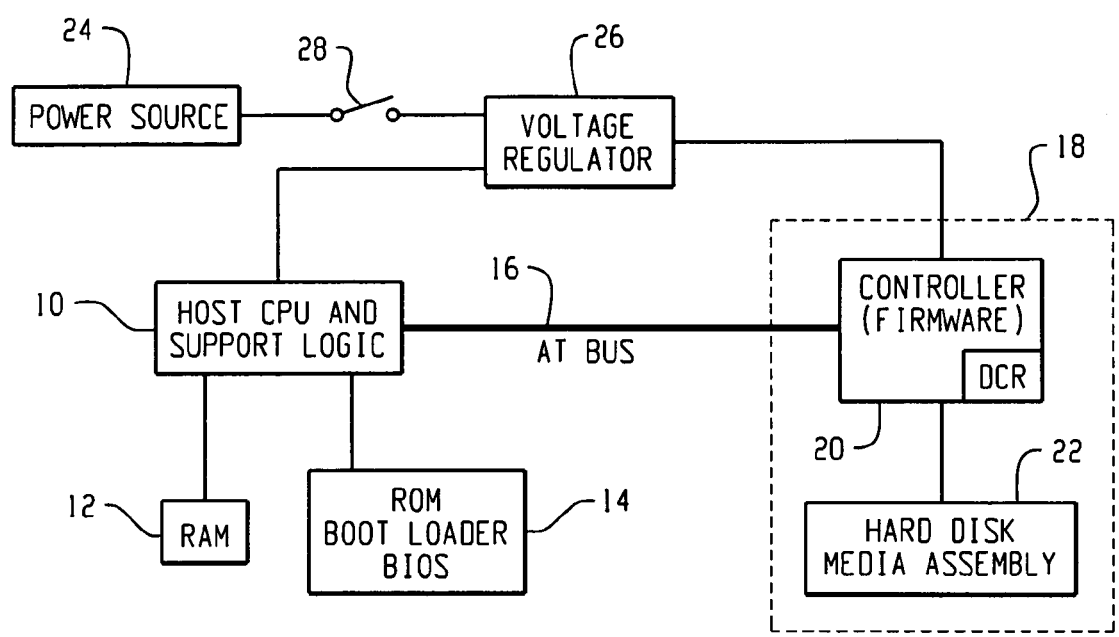
FIG. 1 is a block diagram schematic of an exemplary computer system comprising a storage component coupled to a host CPU over an AT bus.

FIG. 1 is a block diagram schematic of an exemplary computer system suitable for embodying at least one aspect of the present invention. Referring to FIG. 1, the computer system includes at least one host central processing unit (CPU) and associated support logic which shall herein after be referred to collectively as CPU 10. Interfaced to the CPU 10 in this exemplary embodiment are a random access memory (RAM) 12 and a non-volatile or read only memory (ROM) 14. An AT bus 16, which may be serial or parallel, may be used to interface computer components of the system to the host CPU 10. The RAM 12 and ROM 14 may communicate with the host CPU 10 through the AT bus 16 or otherwise. The RAM 12 may be used by the computer system for storage of temporary data, and the non-volatile ROM 14 may be used to store initially executed operational software of the computer system, like a boot loader and basic input/output system (BIOS) software which is part of the operating system (OS) software of the computer system.

Also, coupled to the host CPU 10 through the AT bus 16 is a mass storage component or device 18, which may be a hard disk drive (HDD), for example. The HDD 18 may include: a controller 20 comprising for example a microprocessor and firmware for storing operational software thereof; and a hard disk storage media assembly 22 for storing user data. The controller 20 is coupled to the host CPU 10 over the AT bus 16 for controlling the data storage to and access from storage media 22 of the device 18. Power may be supplied to the system from a power source 24 through an appropriate voltage regulator 26. A power switch 28 may be used to switch power on and off to the system.

In the exemplary embodiment, security mode software set forth by the ATA/ATAPI-7 standard specification referenced above may be stored in non-volatile memory of the HDD 18 as well as in the boot loader and BIOS software of the ROM 14. A storage device which implements such a security mode feature includes the following minimum set of commands: SECURITY SET PASSWORD, SECURITY UNLOCK, SECURITY ERASE PREPARE, SECURITY ERASE UNIT, SECURITY FREEZE LOCK and SECURITY DISABLE PASSWORD. In operation, the security mode feature may be enabled by sending the command SECURITY SET PASSWORD and a USER password via the AT bus 16 to the controller 20 of storage device 18. The operational software of the controller 20, which may be stored in firmware thereof, responds to the set password command and stores the associated USER password in a designated non-volatile storage location of the device 18. Once the security mode feature is enabled, user data may be accessed from the storage device 18 only upon sending the command SECURITY UNLOCK with either the USER password or an optional MASTER password via the AT bus 16 to the controller 20.

In response to the SECURITY SET PASSWORD, the controller 20 may set the security level to High or Maximum, which levels determine the device behavior when the optional Master password is used to unlock the device 18. When the security level is set High, the USER password or the MASTER password may be used any place where a security password is required by the system. When the security level is set Maximum, the USER password may be used with any security command to perform the associated task, but there are restrictions on the use of the MASTER password. The SECURITY FREEZE LOCK command prevents changes to passwords, security states or security levels until a following power cycle, i.e. power off to power on. The purpose of this is to prevent unintended security changes on the system.

Figure 2:
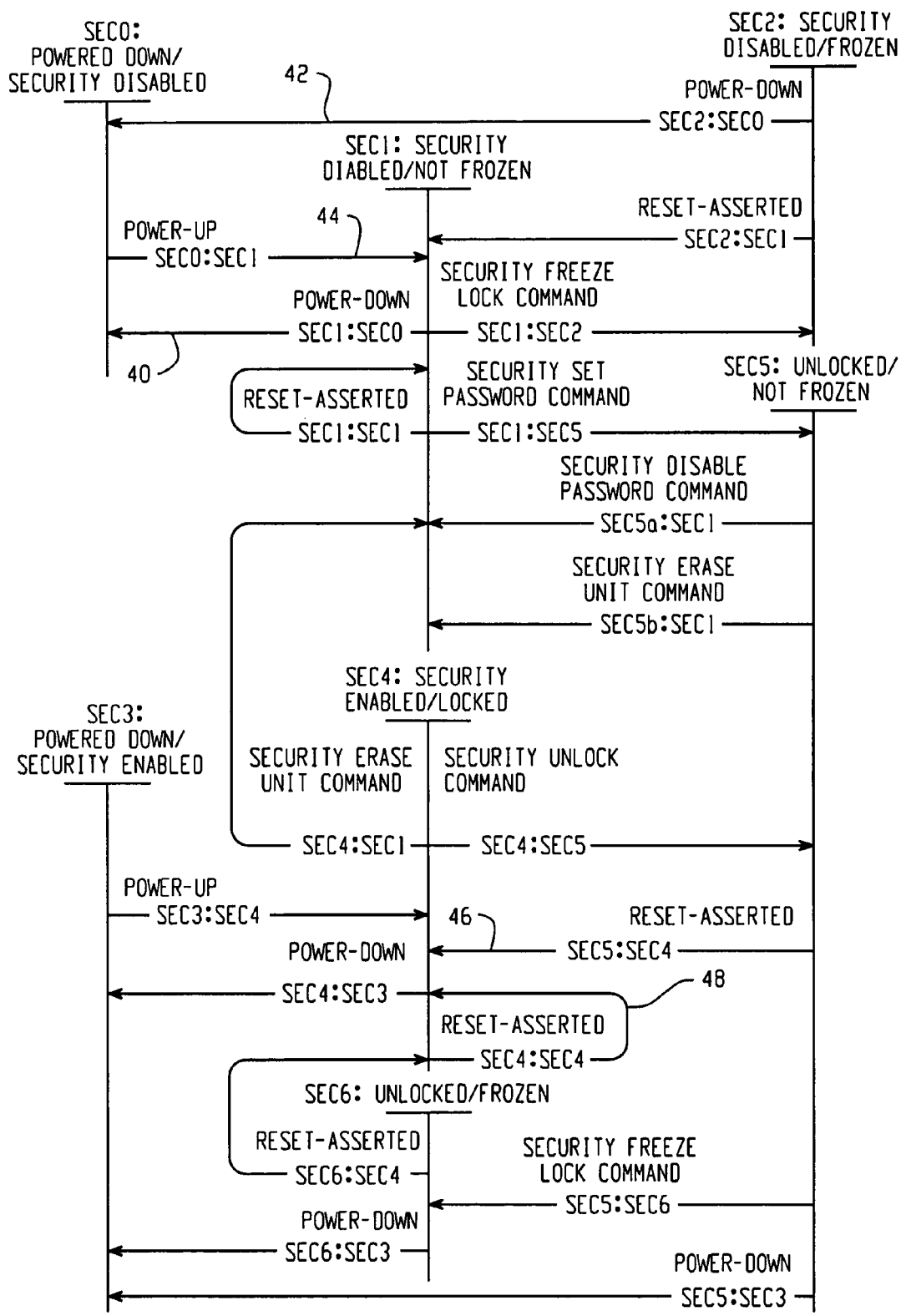
FIG. 2 is a security mode state diagram of security mode features suitable for use in the computer system of FIG. 1 for security of the storage component.

A security mode state diagram of the security mode feature set forth in section 4.7 of the standard specification is shown in FIG. 2. In the present embodiment, the state diagram of FIG. 2 includes seven security states which are as follows: SEC0, SEC1, SEC2, SEC3, SEC4, SEC5 and SEC6, and is used to define the conditions of transitions between the states of the security mode feature. For example, the security state SEC0 is caused to be entered from states SEC1 and SEC2 by the controller 20 when the device 18 is powered down with the security mode feature set disabled as illustrated by arrowed lines 40 (from SEC1) and 42 (from SEC2). When the device 18 is powered up and security mode is disabled, the security state SEC1 is caused to be entered from state SEC0 by the controller 20 as illustrated by the arrowed line 44. Also, when the controller receives a hardware RESET command over the AT bus 16, the device will be caused to transition to state SEC4 from state SEC5 as illustrated by arrowed line 46 or caused to remain in state SEC4 if already in state SEC4 as illustrated by arrowed line 48. Similarly, other transitions between states are defined in FIG. 2 and illustrated by their respective arrowed lines.

The following paragraphs describe exemplary drawbacks when implementing the Security Mode feature set as described in the ATA-7 specification as illustrated in FIG. 2.

With security disabled, if a security freeze lock is not performed, any software may issue a Security Set Password with an unknown/random password, rendering the storage component 18 inaccessible. Therefore, it is recommended to have the system BIOS of ROM 14 issue via the host CPU 10 the SECURITY FREEZE LOCK command before turning execution over to the boot loader of ROM 14. After the SECURITY FREEZE LOCK command has been issued, the storage component 18 is in the SEC2: Security disabled/Frozen state.

In this state, a drawback of the Security Mode feature arises when a condition of a "hard" reset or an asynchronous loss of signal occurs over a serial AT attachment (SATA) bus. In SATA, the hard reset may be caused by the signal COMRESET, and in a parallel AT attachment (PATA) bus, the hard reset may be caused by the signal HRESET. This condition will normally cause a hardware reset to be generated, forcing the storage component 18 to transition from the SEC2 state to the SEC1: Security disabled/not Frozen state. While in the SEC1 state the storage component 18 may accept a Security Set Password command.

A possible scenario of this drawback is as follows: the system BIOS issues via the host CPU 10 the SECURITY FREEZE LOCK command during power-on self test (POST) (SEC2: Security disabled/Frozen). While, in the OS environment, an unintended or rogue software may effect the following steps:

1) Generate a hard reset via the SATA bus Scontrol register or via the PATA bus PCI registers (causes a SEC2:SEC1 security state transition), 2) Issue a Security Set Password with a random password (causes a SEC1:SEC5 security state transition)

3) Issue a Security Freeze Lock command (SEC5:SEC6 security state transition)

4) Generate a hard reset which causes immediate inaccessibility (e.g. blue screen in a Windows™ environment). If this command is not set, the computer system will be prevented from booting up after the next cold start. Under these conditions, the User is no longer able to access data on the storage component 18.

If security is enabled and a SECURITY FREEZE LOCK command has not been issued, any unintended software may issue a Security Set Password with an unknown/random or rogue password, rendering the storage component 18 inaccessible to the User in the future. Therefore, it is recommended that the system BIOS in ROM 14 to issue via the host CPU 10 the SECURITY FREEZE LOCK command before turning execution over to the boot loader in ROM 14. After the SECURITY FREEZE LOCK command has been issued with security disabled, the storage component 18 is in the SEC6: Security disabled/Frozen state.

Also, with security enabled and no FREEZE LOCK command, the condition of a hard reset or asynchronous loss of signal occurring on the SATA bus may cause a generation of a hardware reset in the storage component 18. This reset causes the storage component 18 to transition from the SEC5: Unlocked/Not Frozen state to the SEC4: Security enabled/Locked state. While in state SEC4, the storage component 18 may no longer accept user data access commands via the host CPU 10 or otherwise. Thus, the USER no longer has access to the storage device 18.

A possible scenario of this drawback is as follows: the security feature is enabled by setting the User password and optionally the Master password. Under this condition, the system BIOS issues via the host CPU 10 the SECURITY UNLOCK command with the password during POST (causing a SEC4:SEC5 security state transition). Thus, while in the operating system (OS) environment, an unintended or rogue software may generate a hard reset via the SATA bus Scontrol register (causing a SEC6:SEC4 security state transition). In this state, the User is no longer able to access the storage component 18, causing the OS software to "crash" (e.g. blue screen for Windows™ operating system).

Another drawback of the Security Mode feature arises in the SEC2 state when a hard reset or an asynchronous loss of signal occurs over the SATA bus, which will normally cause the generation of a hardware reset, which may force the storage component 18 to transition from the SEC2 state to the SEC1: Security disabled/not Frozen state. While in the SEC1 state the storage component 18 may accept a Security Set Password command.

Figure 3:
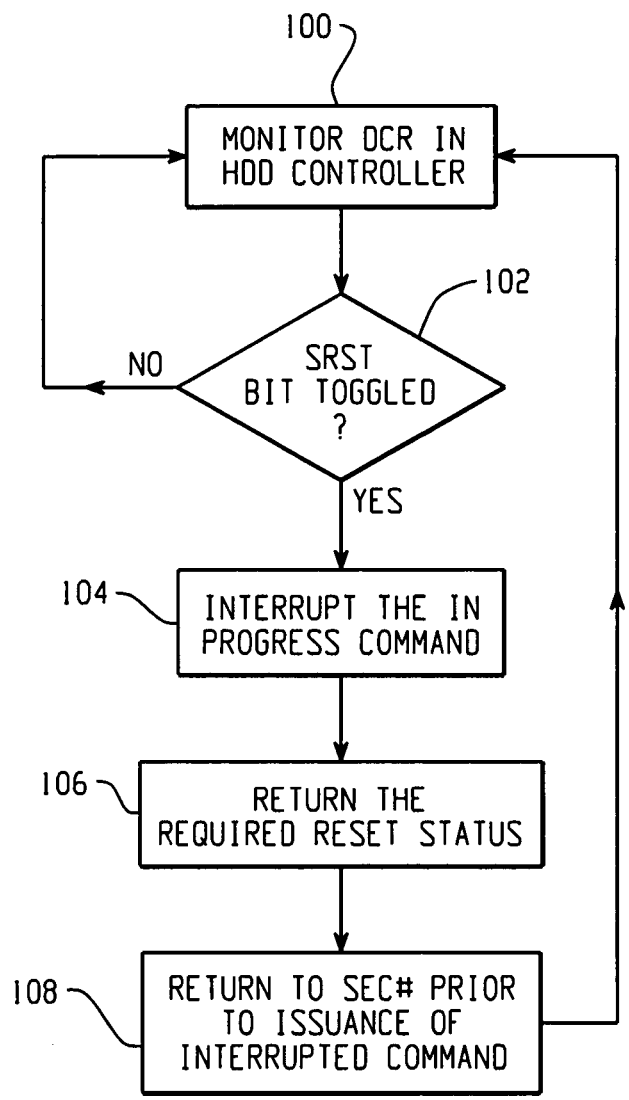
FIG. 3 is a flowchart of exemplary enhancement security software suitable for use in the storage component to ensure that any security command interrupted by a soft reset (SRST) will cause no Security state transition.

To alleviate the conditions of the foregoing described drawbacks, enhancement software may be incorporated into the firmware of controller 20 to ensure that any security command interrupted by a soft reset (SRST) will cause no Security state transition. An example of such software is illustrated by the steps or blocks of the flowchart of FIG. 3. Referring to FIG. 3, one way of detecting a soft reset is to monitor the device control register (DCR) in the controller 20 (see FIG. 1) by the step 100. If the SRST bit of the DCR is toggled as determined by step 102, then the "in progress" command will be interrupted by step 104. After the interrupt task is completed, the software will return the required reset status appropriate for that type of software reset. Thereafter, execution will be returned to the security state (SEC#) prior to the issue of the interrupted command by step 108, thus, ensuring that no unintended security state transition will occur.

One possible scenario of the above described enhancement is when the storage component 18 is in the Security state SEC4: Security Enabled/Locked and the host CPU 10 issues via the AT bus 16 a Security Erase Prepare command and a Security Erase command along with the proper password. Under these conditions, the storage component 18 receives the commands and password from the AT bus 16 and enters a busy state in response to the Security Erase command. Software on the host CPU 10 will time out and send a Soft Reset to the storage component 18 over the AT bus 16. As a result of the enhancement, the storage component 18 responds to the Soft Reset by performing a sequence of steps including sending back to the host CPU 10 via the AT bus 16 a not BSY signal and RDY (appropriate status) signal (step 106) and returning to SEC4 (prior security state) at the end of the Soft Reset sequence (step 108). In this condition, the USER is not allowed access to the data on the device 18 without a password and not allowed access to the device 18 without a complete erasure.

Software may be also incorporated into the firmware of controller 20 to ensure that any power on reset (POR), caused by a system power interruption, for example, initiated while in an original security state or during the execution of a command that started in the original security state will result in only the post POR Security state transitions of the following table:

| Original State | Post POR State |
|---|---|
| SEC1 | SEC1 |
| SEC2 | SEC1 |
| SEC4 | SEC4 |
| SEC5 | SEC4 |
| SEC6 | SEC4 |

Figure 4:
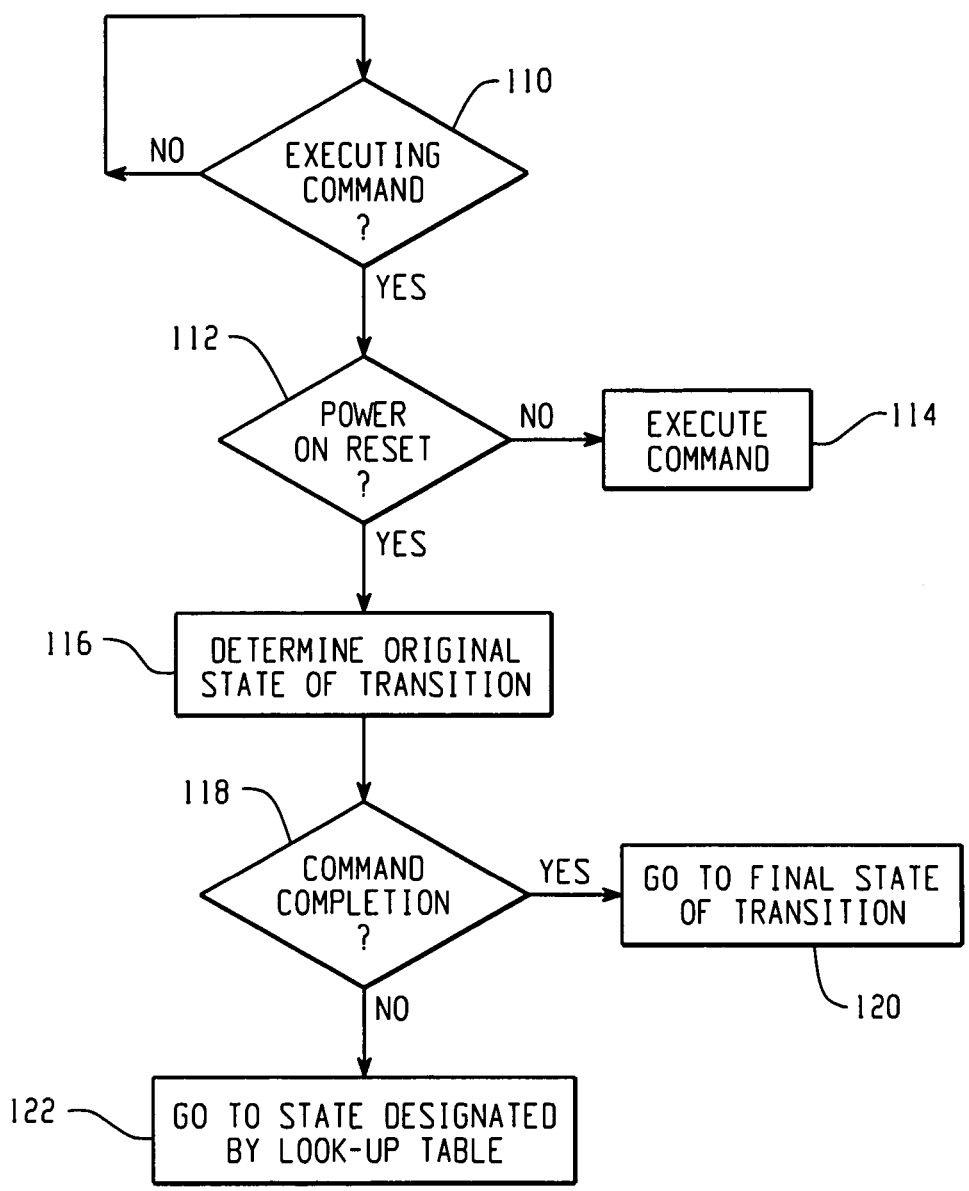
FIG. 4 is a flowchart of exemplary enhancement security software suitable for use in the storage component to ensure that any power on reset (POR) of the system initiated while in an original security state or during the execution of a command that started in the original security state will result in only predetermined post POR Security state transitions.

An example of such software is illustrated by the steps or blocks of the flowchart of FIG. 4. Referring to FIG. 4, in steps 110 and 112, it is determined if a power on reset is initiated during the execution of a command. If not, then the command will continue to be executed in step 114. However, if a POR is initiated, then in block 116, the original state of the command being executed or otherwise is determined. If execution of the command has been completed as determined by step 118, then upon power return, the software will go to the final state of the command transition in step 120. Otherwise, upon power up, the software will be diverted in step 122 to the security state designated by the table above which may be stored in the firmware of the controller 20 as a look-up table, for example.

Figure 5:
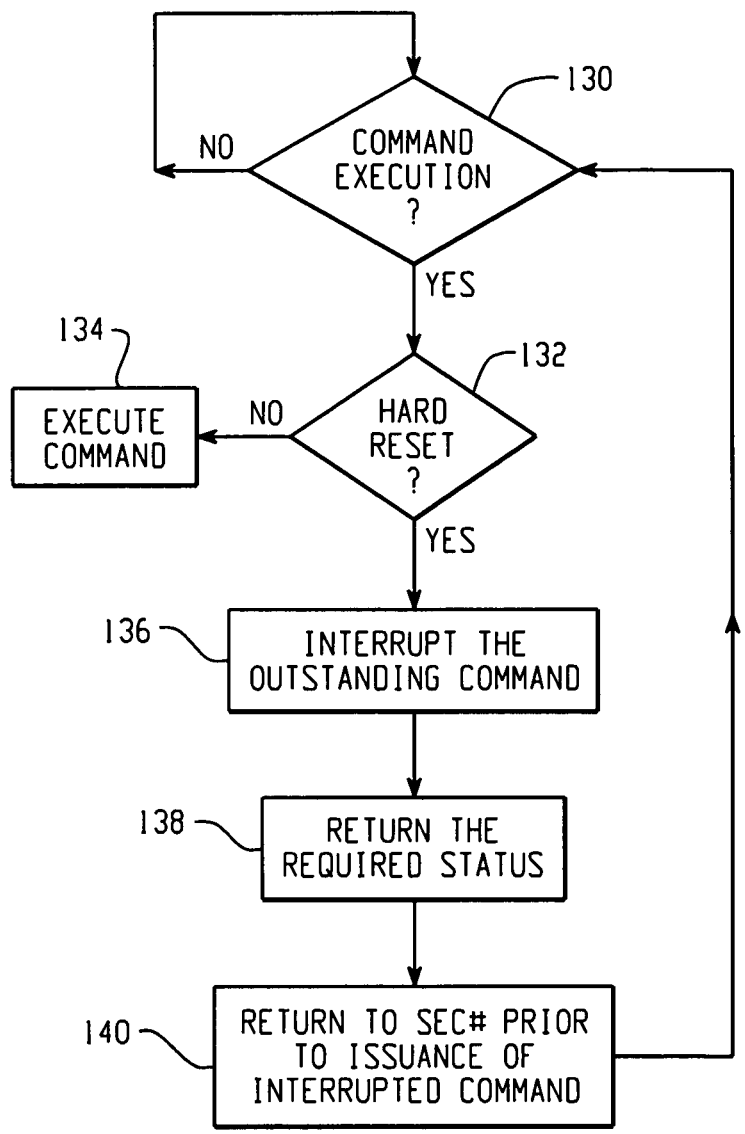
FIG. 5 is a flowchart of exemplary enhancement security software suitable for use in the storage component to ensure that a hard reset command issued over the AT bus during a security command execution shall cause no Security state transitions.

Software may be also incorporated into the firmware of controller 20 to ensure that a hard reset command issued over the AT bus 16 during a security command execution shall cause no Security state transitions. An example of this software is illustrated by the flowchart of FIG. 5. Referring to FIG. 5, steps 130 and 132 determine if a hard reset command is issued and received by the controller 20 during its execution of a security command. If no hard reset is issued, the command will continue to be executed by controller 20 in step 134. Otherwise, any security command interrupted by the hard reset command will cause the controller 20 to interrupt the outstanding command in step 136 and to return the required status appropriate for that type of reset to the host CPU 10 via the AT bus 16 in step 138. At the end of the hard reset sequence, the controller 20 will return to the security state prior to the issuance of the interrupted command, i.e. original security state, in step 140.

Figure 6A:
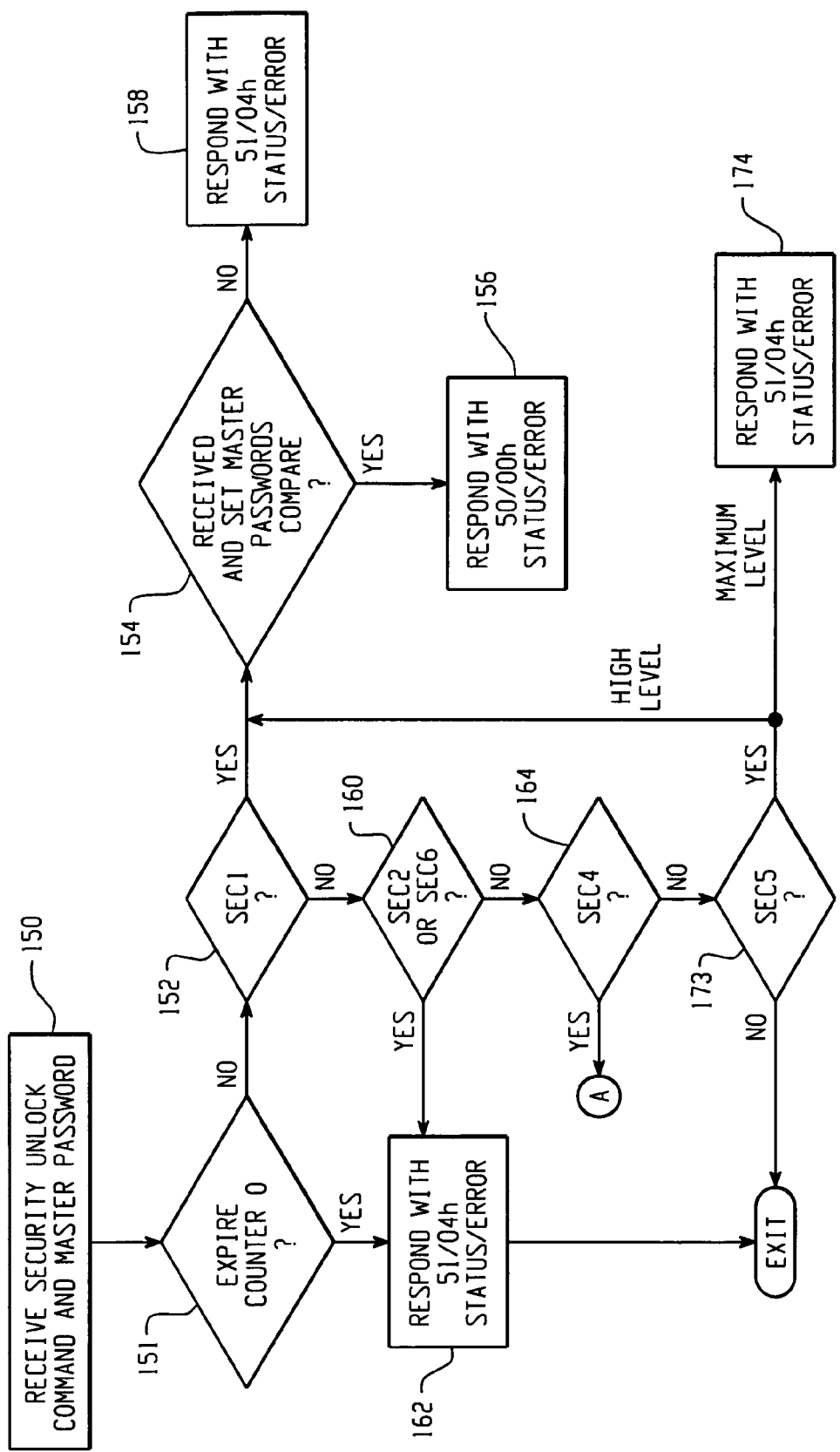
FIGS. 6A and 6B compositely depict a flowchart of exemplary enhancement security software suitable for use in the storage component to handle a condition in which a Security Unlock command is issued over the AT bus 16 along with a Master password.
Figure 6B:
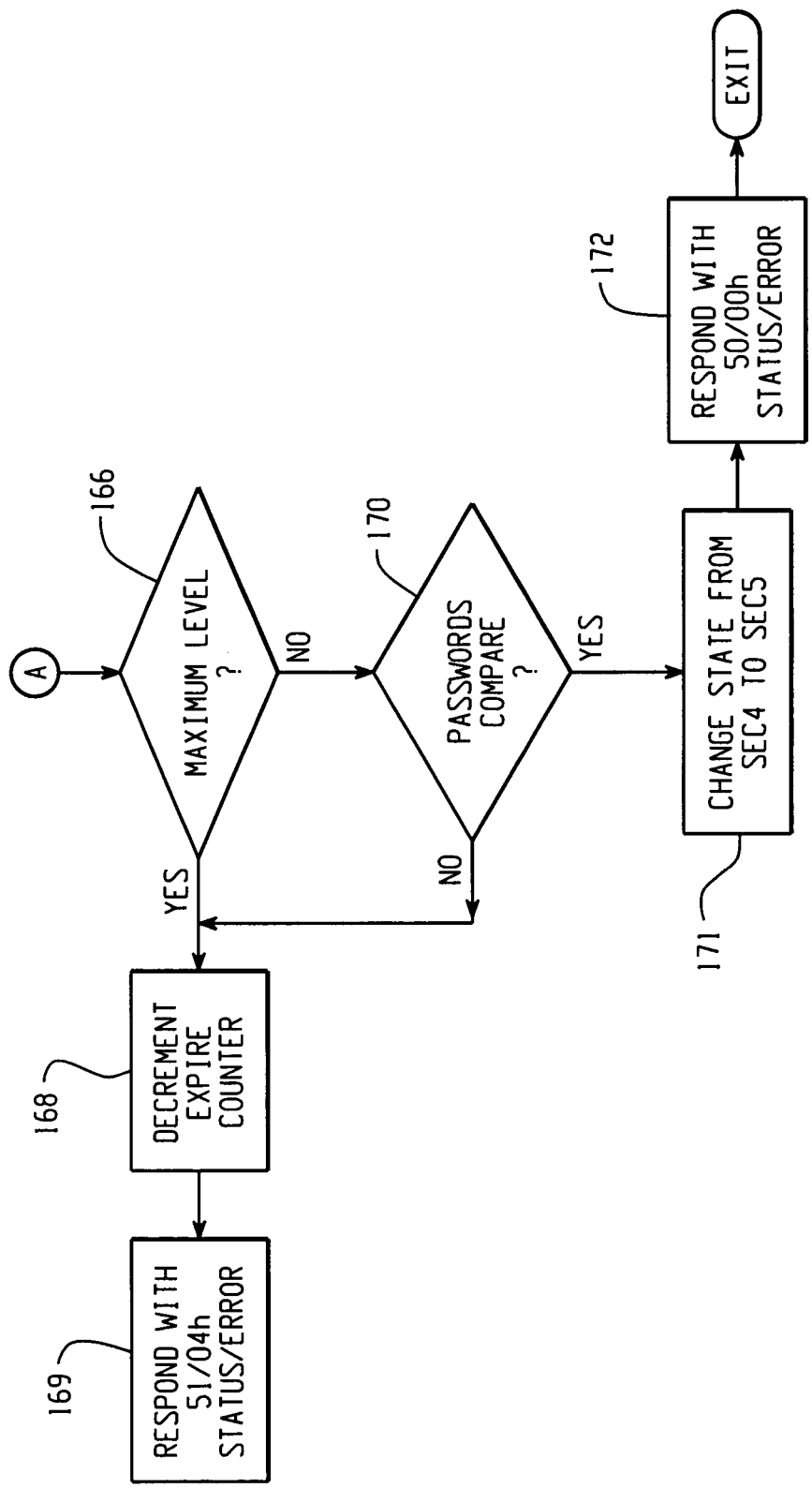

Additional software may be also incorporated into the firmware of controller 20 to handle the condition in which a Security Unlock command is issued over the AT bus 16 along with a Master Password. The intent is to make the Security Unlock command behave like the Security Erase command so that there are fewer unique security decisions which will decrease the likelihood of an implementation issue. An example of such software is illustrated by the flowchart of FIGS. 6A and 6B. Referring to FIGS. 6A and 6B, in step 150, the controller 20 receives a Security Unlock command and a Master Password over the AT bus 16 and, in step 151, the controller 20 determines if an expire counter has been decremented to a predetermined number which is zero (0) in the present example. In the present embodiment, the expire counter is decremented each time the received and set passwords do not match which will become more evident from the following description. However, it is understood that the expire counter could just as well be counted up to a predetermined number without deviating from the broad principles of the present invention.

If the predetermined number of the expire counter has not been reached, the controller 20 next determines in which security state it is operating. If operating in security state SEC1 (Disabled state—see FIG. 2) as determined by decisional step 152, then the controller 20 will compare the received Master Password with the most recently set Master Password which is stored in a designated memory location of the storage device 18. If the two passwords compare or match as determined by the decisional step 154, the controller 20 will respond by sending to the host CPU 10 via the AT bus 16 a status/error code of 50/00 hex in step 156. Otherwise, the controller 20 will respond by sending to the host CPU 10 via the AT bus 16 a status/error code of 51/04 hex in step 158. The program will exit after executing either step 156 or 158.

If the controller 20 is operating in security state SEC2 or SEC6 (Frozen States—see FIG. 2) during reception of the Security Unlock command and Master Password as determined by step 160, it will respond by sending to the host CPU 10 via the AT bus 16 a status/error code of 51/04 hex in step 162. Controller 20 will also respond by sending to the host CPU 10 via the AT bus 16 the status/error code of 51/04 hex in step 162 if the expire counter has reached its predetermined number. The program will exit after executing step If the controller 20 is operating in security state SEC4 (Locked state—see FIG. 2) during reception of the Security Unlock command and Master Password as determined by step 164 and the current User Password level is set to Maximum as determined by decisional step 166, it will respond by decrementing an expire counter thereof in step 168 and sending to the host CPU 10 via the AT bus 16 the status/error code of 51/04 hex in step 169. If the current User Password level is not set to Maximum as determined by decisional step 166, the controller 20 will compare the received and set passwords in step 170. If there is a match in passwords, the controller 20 will respond by changing the security state SEC4 to SEC5 in step 171 and sending to the host CPU 10 via the AT bus 16 a status/error code of 50/00 hex in step 172. On the other hand, if there is no match in passwords, program execution will be diverted to step 168. Controller 20 will exit execution of the program after executing either step 169 or step 172.

If the controller 20 is operating in security state SEC5 (Unlocked state—see FIG. 2) during reception of the Security Unlock command and Master Password as determined by step 173 and the current User Password level is set to Maximum, it will respond by sending to the host CPU 10 via the AT bus 16 a status/error code of 51/04 hex in step 174, i.e. all security unlock attempts with a master password shall result in a 51/04 hex status/error response. If the controller 20 is operating in security state SEC5 (Unlocked state—see FIG. 2) during reception of the Security Unlock command and Master Password as determined by step 173 and the current User Password level is set to High, it will divert software execution to step 154 in which the received and set Master Passwords are compared. If the two passwords match as determined by step 154, then the controller 20 will respond in step 156 by sending a status/error digital code of 50/00 hex over the AT bus 16 to the host CPU 10. Otherwise, the controller 20 will respond in step 158 by sending a status/error digital code of 51/04 hex over the AT bus 16 to the host CPU 10. If the controller 20 is not in any security state as determined by the steps 152, 160, 164 and 173, then it will respond to the reception of the Security Unlock command and Master Password, by exiting execution of the software.

Figure 7A:
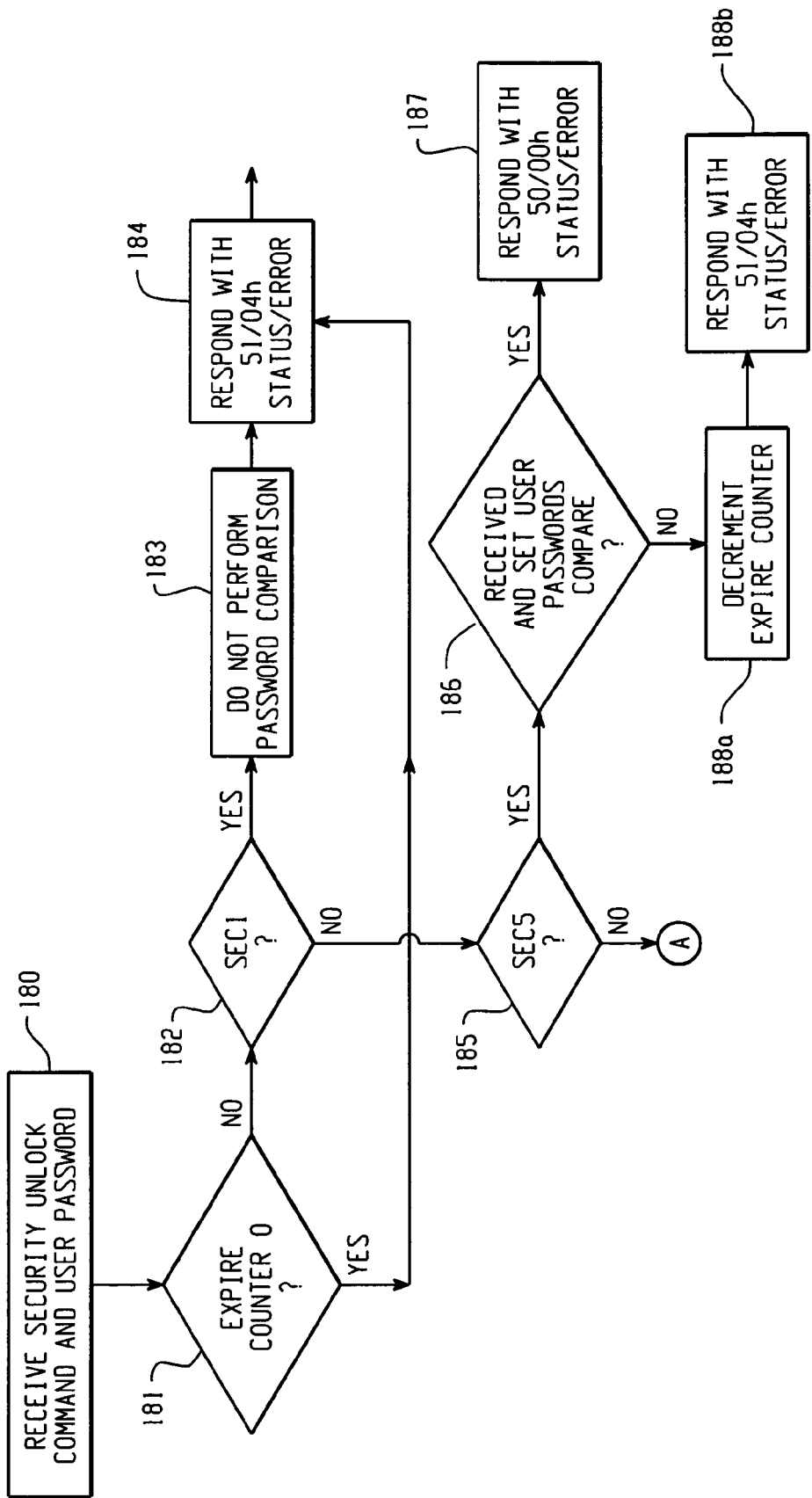
FIGS. 7A and 7B compositely depict a flowchart of exemplary enhancement security software suitable for use in the storage component to handle a condition in which a Security Unlock command is issued over the AT bus 16 along with a User password.
Figure 7B:
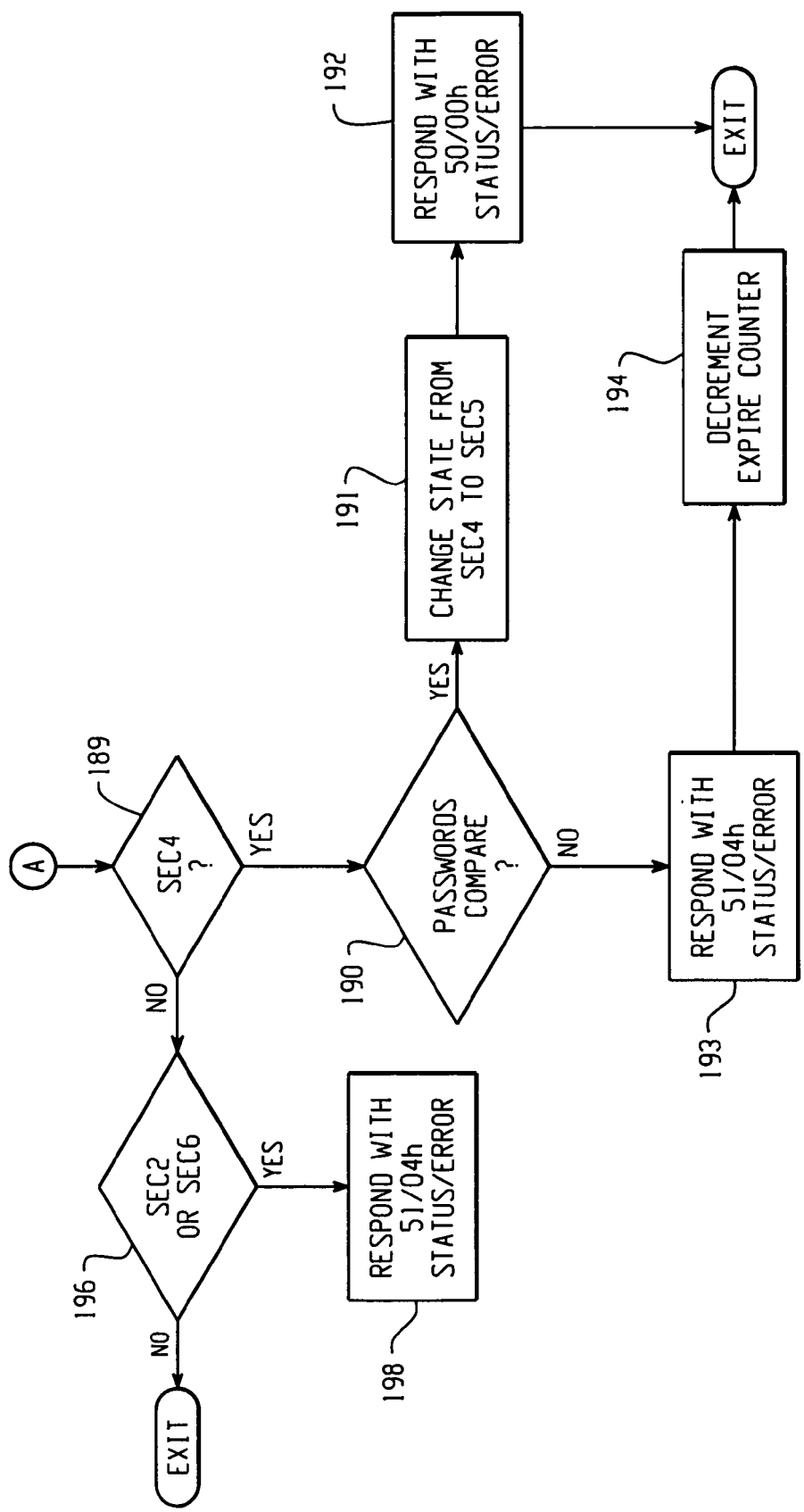

Further software may be also incorporated into the firmware of controller 20 to handle the condition in which a Security Unlock command is issued over the AT bus 16 along with a User Password. The intent is to limit the actual password comparisons to only times when an expire counter is used or the proper password has already been given to limit the ability for rogue software to do unbounded password testing. An example of such software is illustrated by the flowchart of FIGS. 7A and 7B. Referring to FIGS. 7A and 7B, in step 180, the controller 20 receives the Security Unlock command and a User Password via the AT bus 16. Thereafter, in step 181, the controller 20 determines if the expire counter has reached its predetermined number, e.g. zero. If not, the controller 20 determines if it is in the security state SEC1 in step 182. If in SEC1, the controller 20 will not perform a password comparison in step 183 and instead, will respond to the Security Unlock command by sending in step 184 a status/error code of 51/04 hex over the AT bus 16 to the host CPU 10. Also, if the expire counter has reached its predetermined number as determined by step 181, the controller 20 will respond by sending in step 184 the status/error code of 51/04 hex over the AT bus 16 to the host CPU 10.

If the controller 20 is in the security state SEC5 as determined by step 185, it will perform a comparison of the received and set User passwords in step 186 and, if the two passwords match, it will send in step 187 a status/error code of 50/00 hex over the AT bus 16 to the host CPU 10. Otherwise, if the two passwords do not match, the controller 20 will decrement the expire counter in step 188*a* and will send in step 188*b* a status/error code of 51/04 hex over the AT bus 16 to the host CPU 10.

If the controller 20 is in the security state SEC4 as determined by step 189, it will perform a comparison of the received and set User passwords in step 190 and, if the two passwords match, it will change the security state from SEC4 to SEC5 in step 191 and send in step 192 a status/error code of 50/00 hex over the AT bus 16 to the host CPU 10. Otherwise, if the two passwords do not match, the controller 20 will send in step 193 a status/error code of 51/04 hex over the AT bus 16 to the host CPU 10 and decrement the expire counter in step 194. If the controller is in either security state SEC2 or SEC6 as determined by step 196, it will respond by sending in step 198 a status/error code of 51/04 hex over the AT bus 16 to the host CPU 10. If the controller 20 is not in any security state as determined by the steps 182, 185, 189, and 196, then it will respond to the reception of the Security Unlock command and User Password, by exiting execution of the software.

Still further software may be also incorporated into the firmware of controller 20 to handle certain conditions under support for enhanced security. An example of such software is illustrated by the flowchart of FIGS. 8, 8A, 8B and 8C. Referring to FIGS. 8, 8A, 8B and 8C, if the controller 20 includes software to support an enhanced security mode, then if it receives a command, it first checks the expire counter in step 200 to determine if it has reached the predetermined number. For example, if the expire counter has been decremented to zero, the controller 20 will abort all security commands for all security states in step 201. If the expire counter has not been decremented to zero, the controller 20 determines the received command and diverts program execution to the appropriate set of instructions or steps.

Figure 8:
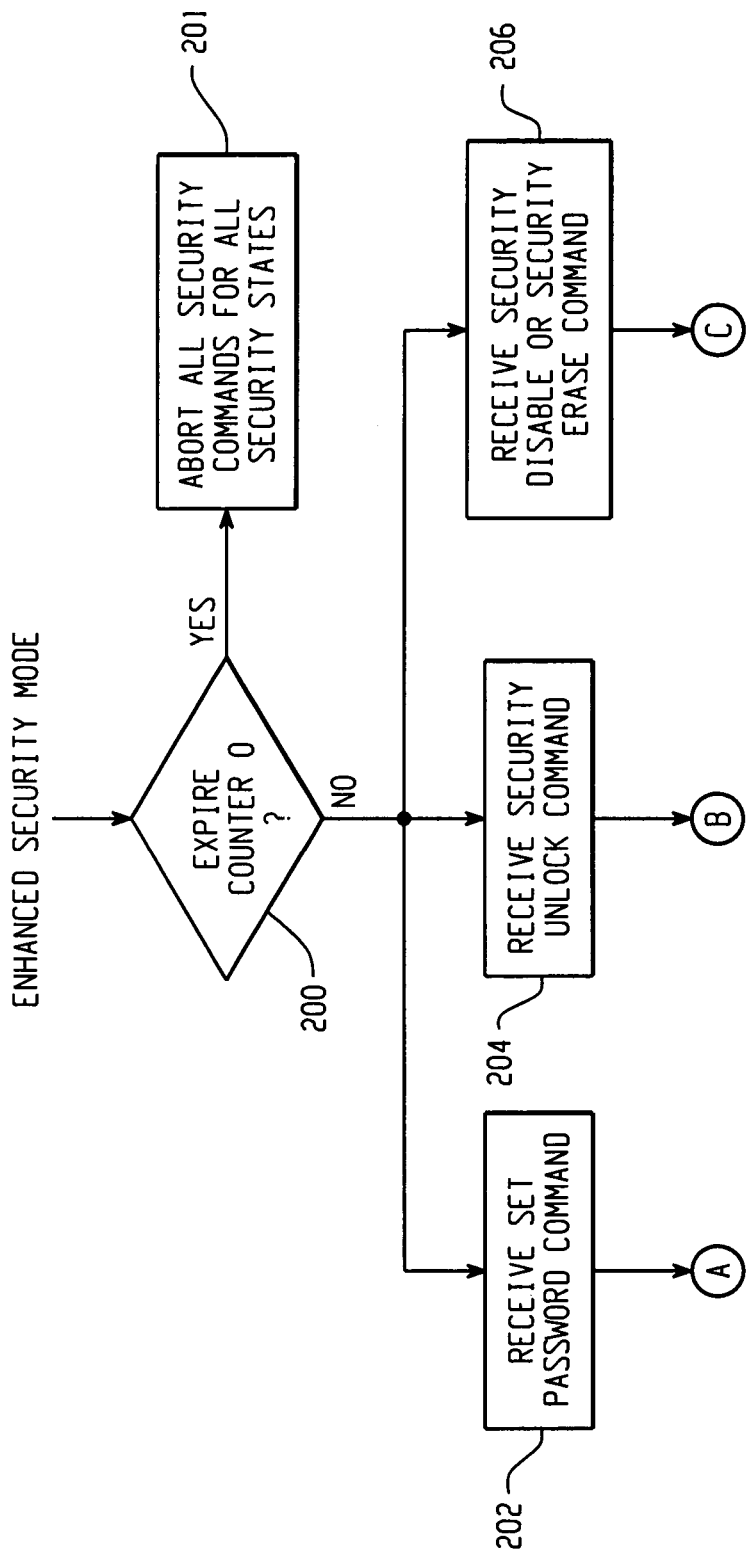
FIGS. 8, 8A, 8B and 8C compositely depict a flowchart of exemplary enhancement security software suitable for use in the storage component to handle enhanced security mode conditions in which one of a Set Password command, a Security Unlock command, a Security disable command and a Security erase command along with an associated password are received from the AT bus by the storage component.
Figure 8A:
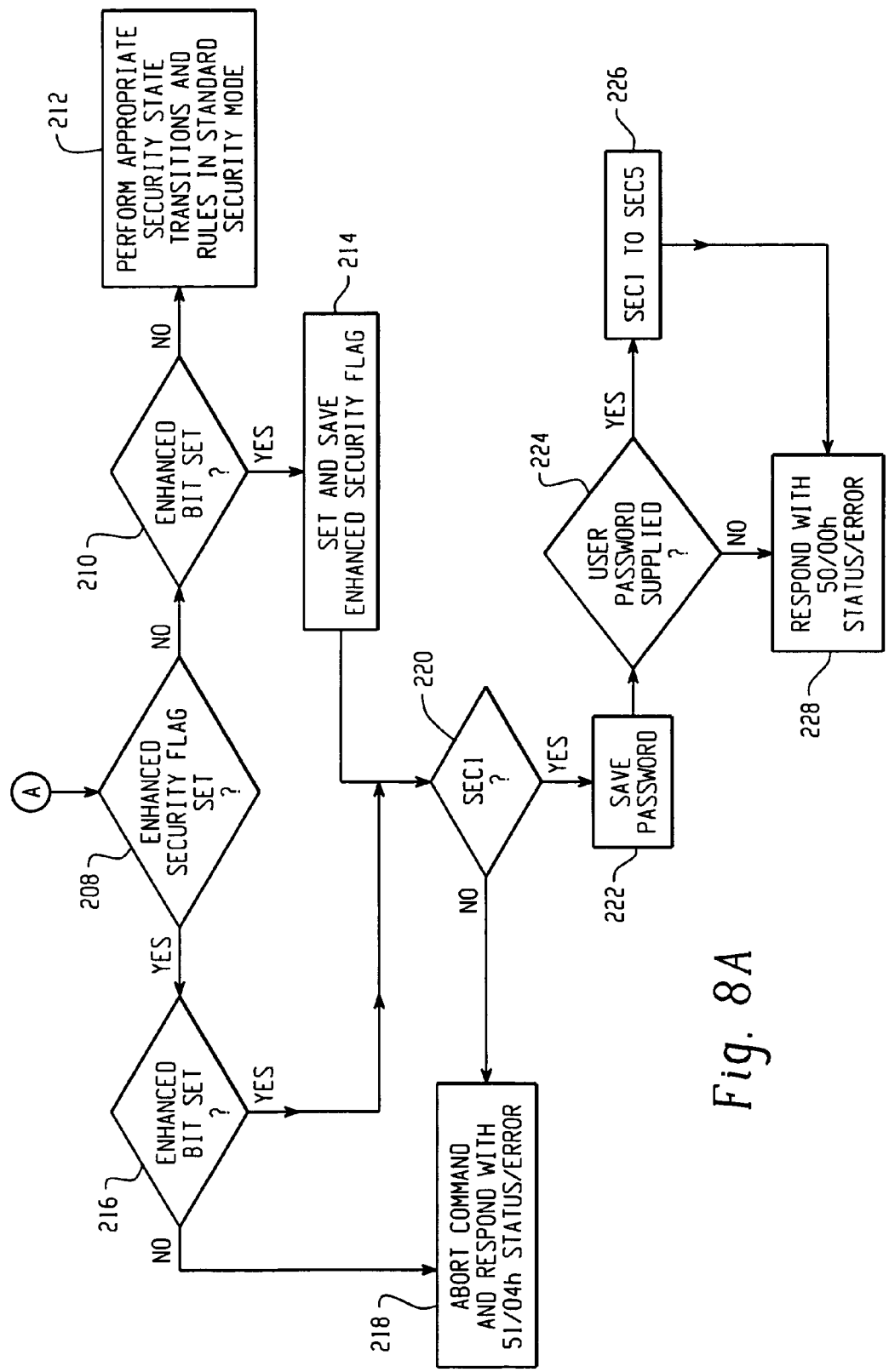
Figure 8B:
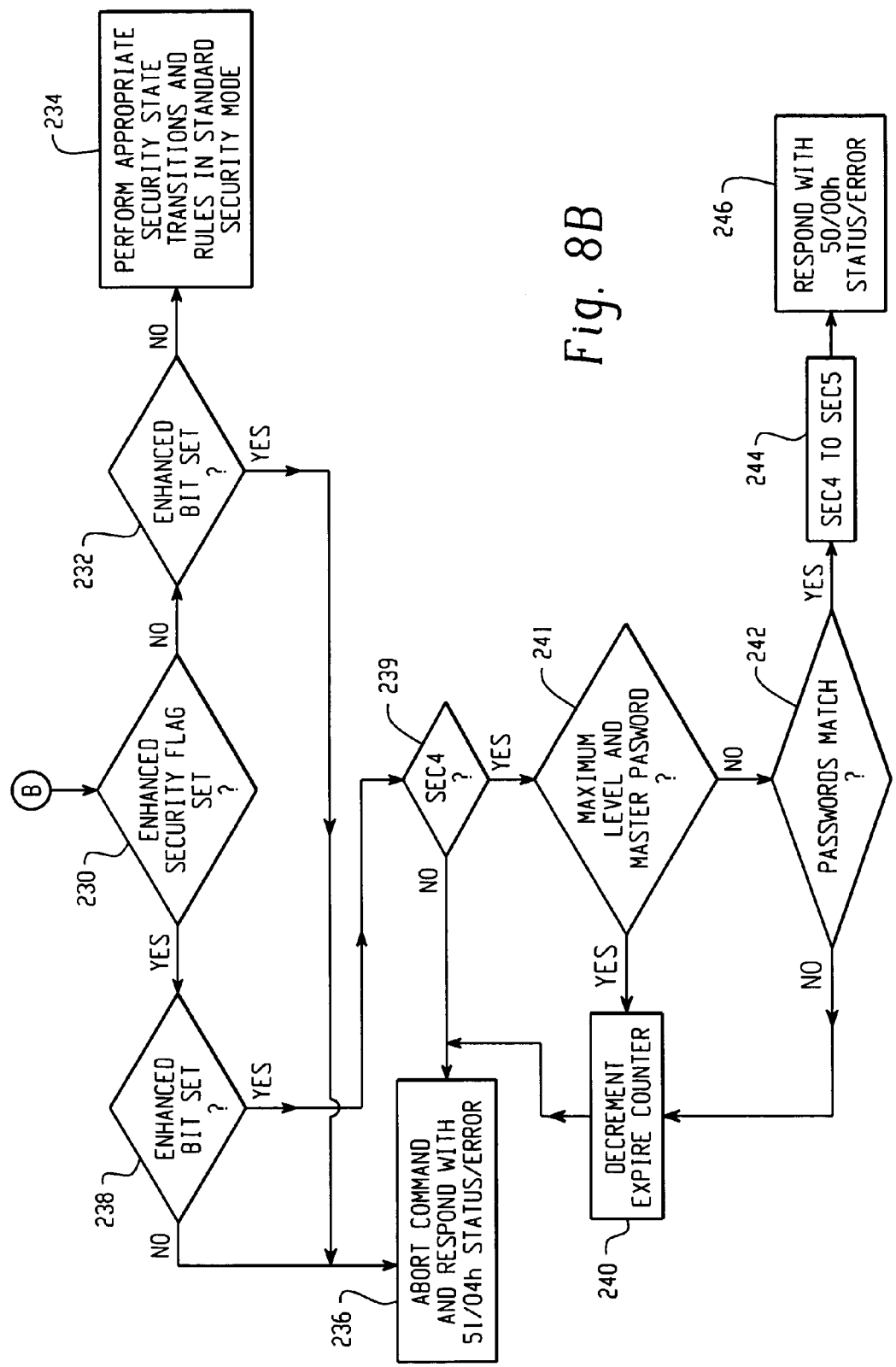
Figure 8C:
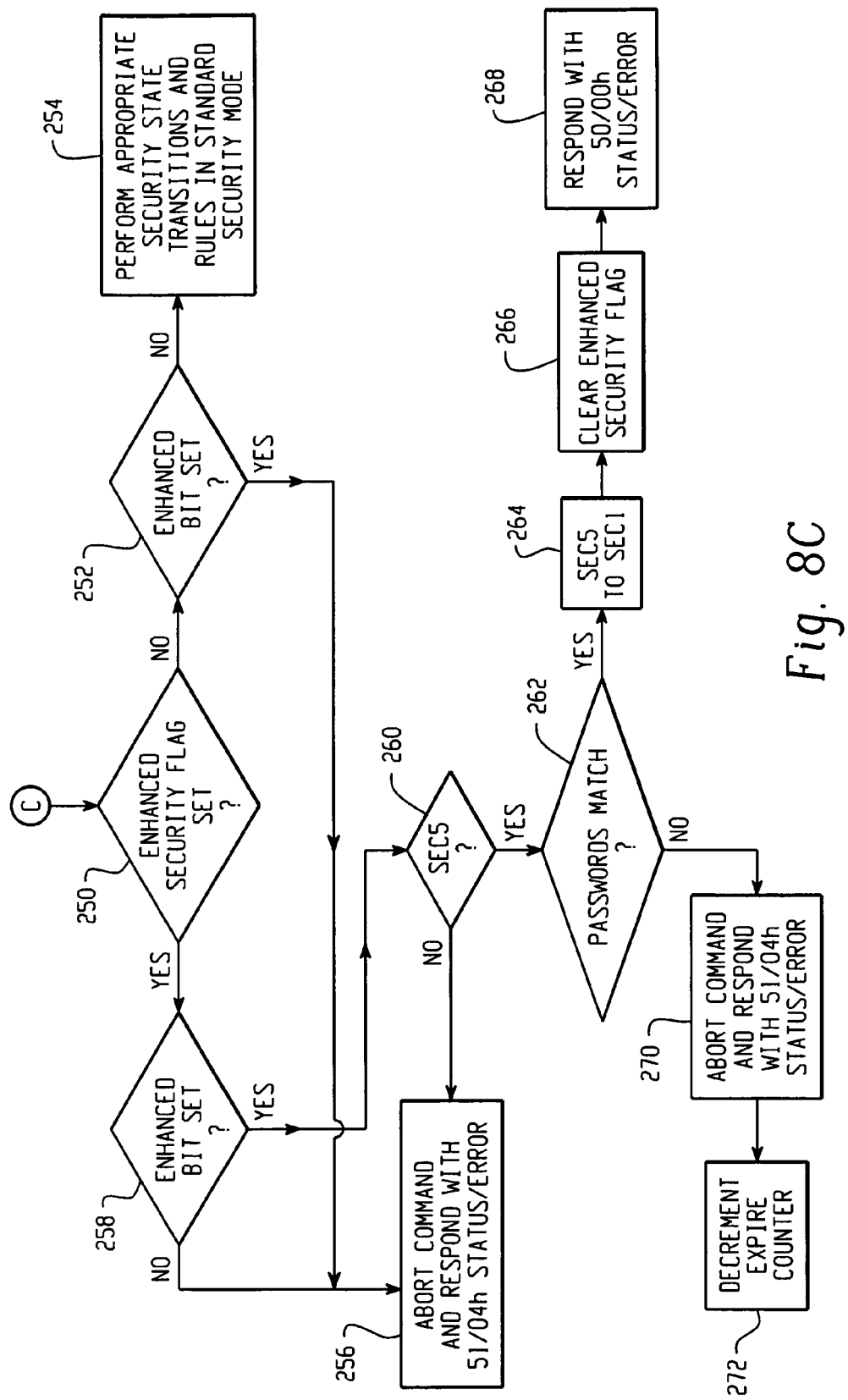

For example, if a Set Password command and its associated password are determined to have been received in step 202, then program execution is diverted to the steps illustrated in the flowchart of FIG. 8A; if a Security Unlock command and its associated password are determined to have been received in step 204, then program execution is diverted to the steps illustrated in the flowchart of FIG. 8B; and if a Security Disable or Security Erase command and its associated password are determined to have been received in step 206, then program execution is diverted to the steps illustrated in the flowchart of FIG. 8C. While the flowchart of FIG. 8C will be used for program execution of both Security Disable and Security Erase commands, there is a difference in the program execution between the two which will be explained in greater detail below.

For the reception of the Set Password command, the flowchart of FIG. 8A starts with determining in step 208 if an enhanced security flag has been set which is indicative of the enhanced security mode being enabled. If not set, it is determined if an enhanced security bit is set in step 210. If not set, the program will perform appropriate security state transitions and rules according to the standard security mode, i.e. not enhanced mode, in step 212. Otherwise, if the enhanced bit is determined to be set in step 210, the enhanced security flag will be set and saved in step 214, thus enabling the enhanced security mode. Once the enhanced security flag is set, it will remain set over all power cycles and resets until disabled or cleared by the program as will become more evident by the following description. When the controller 20 is in the enhanced security mode, it shall require all data payload security commands to have the enhanced security bit set and shall enforce all enhanced security rules.

If it is determined that the enhanced security flag is set in step 208, it is determined if an enhanced security bit is set in step 216. If not set, the program will abort the received command and respond by sending a status/error code of 51/01 hex to the host CPU 10 via the AT bus 16 in step 218. If the enhanced bit is set as determined by step 216 or after execution of step 214, it is determined if the controller 20 is in security state SEC1 as determined by step 220. If it is determined in step 220 that the controller 20 is in any other state than SEC1, then the software will be diverted to step 218 wherein the command will be aborted and controller 20 will send a status/error code of 51/04 hex over the AT bus 16 to the host CPU 10. The intent of this enhancement is to always require the host CPU 10 to disable the security mode with a password before a new password may be installed.

If the controller is in state SEC1, then the controller 20 will save the received password in step 222. Thereafter, if a User password is supplied as determined by step 224, the security state of controller 20 is changed from SEC1 to SEC5 in step 226. Whether or not a User password is supplied, the controller 20 will send the status code of 50/00 hex to the host CPU 10 via the AT bus 16 in step 228.

If a Security Unlock command and associated password are received by the controller 20 in step 204, then program execution is diverted to the flowchart of FIG. 8B which starts with determining in step 230 if the enhanced security flag has been set. If not set, it is determined if the enhanced security bit is set in step 232. If not set, the program will perform appropriate security state transitions and rules according to the standard security mode, i.e. not enhanced mode, in step 234. Otherwise, if the enhanced bit is determined to be set in step 232, the command will be aborted and a status/error code of 51/04 hex will be sent to the host CPU 10 via the AT bus in step 236. If it is determined that the enhanced security flag is set in step 230, it is determined if the enhanced security bit is set in step 238. If not set, the program will also abort the received command and respond by sending a status/error code of 51/01 hex to the host CPU 10 via the AT bus 16 in step 236.

If the enhanced bit is determined to be set by step 238, it is next determined in step 239 if the controller 20 is in the state SEC4. If the controller 20 is in any other state than SEC4 as determined by step 239, then software execution may be diverted to step 236 wherein the command will be aborted and controller 20 will send a status/error code of 51/04 hex over the AT bus 16 to the host CPU 10. Otherwise, if the controller 20 is determined to be in SEC4 by step 239, the program will check to determine if the user level is set to maximum and the Master password was received in step 241. If so, the expire counter will be decremented in step 240 and thereafter, step 236 is executed. Otherwise, the received and set passwords are compared in step 242 and if there is determined to be a password match, then the security state is changed from SEC4 to SEC5 in step 244 and a status/error code of 50/00 hex will be sent to the host CPU 10 via the AT bus 16 in step 246. If the passwords do not match in step 242, the controller 20 will decrement the expire counter in step 240 and abort the command and send a status/error code of 51/04 hex to the host CPU 10 via the AT bus 16 in step 236 and exit program execution.

If a Security Disable or Security Erase command is received along with its associated password by the controller 20 in step 206, then program execution is diverted to the flowchart of FIG. 8C which starts with determining in step 250 if the enhanced security flag has been set. If not set, it is determined if the enhanced security bit is set in step 252. If not set, the program will perform appropriate security state transitions and rules according to the standard security mode, i.e. not enhanced mode, in step 254. Otherwise, if the enhanced bit is determined to be set in step 252, the command will be aborted and a status/error code of 51/04 hex will be sent to the host CPU 10 via the AT bus in step 256. If it is determined that the enhanced security flag is set in step 250, it is determined if the enhanced security bit is set in step 258. If not set, the program will also abort the received command and respond by sending a status/error code of 51/01 hex to the host CPU 10 via the AT bus 16 in step 256.

If the enhanced bit is determined to be set by step 258, it is next determined in step 260 if the controller 20 is in the state SEC5 for the Security Disable command or in either state SEC4 or SEC5 for the Security Erase command. If the controller 20 is in any other state than SEC5 for the Security Disable command or than state SEC4 or SEC5 for the Security Erase command as determined by step 260, then software execution may be diverted to step 256 wherein the command will be aborted and controller 20 will send a status/error code of 51/04 hex over the AT bus 16 to the host CPU 10.

Otherwise, if the controller 20 is determined to be in state SEC5 for the Security Disable command or in either state SEC4 or SEC5 for the Security Erase command by step 260, the received and set passwords are compared in step 262. There are different password matching rules for the Security Disable and Security Erase commands in the present embodiment. For the Security Disable command, if the user level is set to "high", either User or Master passwords may be used, but if the user level is set to "maximum", then only the User passwords may be used. For the Security Erase command, either the User or the Master passwords may be used independent of which user level, "high" or "maximum", is set.

If there is determined to be a password match in step 262, then the security state is changed from SEC5 or SEC4 to SEC1 in step 264. Thereafter, the security enhanced flag will be cleared in step 266 and the controller 20 will send a status code of 50/00 hex to the host CPU 10 via the AT bus 16 in step 268 and exit program execution. If no password match is determined by step 262, the program will abort the received command and respond by sending a status/error code of 51/01 hex to the host CPU 10 via the AT bus 16 in step 270. Thereafter, the expire counter will be decremented in step 272 and the program will be exited.

While aspects of the present invention have been presented herein above in connection with a variety of embodiments, it is understood that all such embodiments are merely described by way of example. Accordingly, the present invention and all of its aspects should not be limited in any way by the various embodiments presented above, but rather construed in breadth and broad scope in accordance with the recitation of the claims appended hereto.

What is claimed is:

1. Method of enhancing security of a storage component communicating with a host processor over a bus, said method comprising:
    receiving from the bus by the storage component one of a security unlock command, set password command, security disable command and security erase command along with a password associated therewith;
    determining a security state in which the storage component is operating at reception of the received command;
    determining if an enhanced security mode is enabled at reception of the received command; and
    performing security steps of the received command based on the determined security state and the determined security mode.

2. The method of claim 1 including if the set password command is received and the enhanced security mode is enabled, performing the security steps associated with the set password command if the determined security state is a first security state, and aborting the set password command and sending a first predetermined status/error code to the host processor if the determined security state is other than the first security state.

3. The method of claim 2 including if the set password command is received, the enhanced security mode is enabled, and the determined security state is the first security state, saving the received password; changing from the first security state to a fifth security state if said received password is a user password; and sending a second predetermined status/error code to the host processor.

4. The method of claim 1 including if the set password command is received and the enhanced security mode is not enabled, enabling the enhanced security mode if an enhanced security bit is set in the storage component.

5. The method of claim 1 including if the security unlock command is received and the enhanced security mode is enabled, performing the security steps of the security unlock command if the determined security state is a fourth security state; and aborting the security unlock command and sending a first predetermined status/error code to the host processor if the determined security state is other than the fourth security state.

6. The method of claim 5 including if the security unlock command is received and the enhanced security mode is enabled, altering the count of an expire counter if the determined security state is other than the fourth security state.

7. The method of claim 5 including if the security unlock command is received, the enhanced security mode is enabled, and the determined security state is the fourth security state, comparing the received password with a preset password; if said passwords match, changing from the fourth security state to a fifth security state and sending a second predetermined status/error code to the host processor; and if said passwords do not match, aborting the security unlock command and sending the first predetermined status/error code to the host processor.

8. The method of claim 1 including if the security disable command is received and the enhanced security mode is enabled, performing the security steps of the received command if the determined security state is a fifth security state; and aborting the received command and sending a first predetermined status/error code to the host processor if the determined security state is other than the fifth security state.

9. The method of claim 8 including if the security disable command is received, the enhanced security mode is enabled, and the determined security state is the fifth security state, comparing the received password with a preset password; if the passwords match, changing from the fifth security state to a first security state, disabling the enhanced security mode, and sending a second predetermined status/error code to the host processor; and if the passwords do not match, aborting the received command, sending the first predetermined status/error code to the host processor and altering a count of an expire counter.

10. The method of claim 1 including if the security erase command is received and the enhanced security mode is enabled, performing the security steps of the received command if the determined security state is one of a fourth and fifth security states; and aborting the received command and sending a first predetermined status/error code to the host processor if the determined security state is other than one of the fourth and fifth security states.

11. The method of claim 10 including if the security erase command is received, the enhanced security mode is enabled, and the determined security state is one of the fourth and fifth security states, comparing the received password with a preset password; if the passwords match, changing from one of the fourth and fifth security states to a first security state, disabling the enhanced security mode, and sending a second predetermined status/error code to the host processor; and if the passwords do not match, aborting the received command, sending the first predetermined status/error code to the host processor and altering a count of an expire counter.

12. The method of claim 1 including the steps of: determining if an expire counter is altered to a predetermined count; and aborting all received security commands for all security states if the expire counter is determined to be at said predetermined count.

13. Method of enabling an enhanced security mode for securing access to a storage component communicating with a host processor over a bus, said method comprising:

receiving from the bus by the storage component a set password command;

determining if an enhanced security bit is set; and enabling an enhanced security mode if the enhanced security bit is set.

14. The method of claim 13 including determining a security state in which the storage component is operating when the enhanced security mode is enabled; and performing security steps of a received command in the enhanced security mode based on the determined security state.

15. The method of claim 13 including performing security steps of a received command in a non-enhanced security mode if the enhanced security bit is not set.

16. The method of claim 13 including the steps of: determining if an expire counter is altered to a predetermined count; and aborting all received security commands for all security states if the expire counter is determined to be at said predetermined count.

17. Method of disabling an enhanced security mode for securing access to a storage component communicating with a host processor over a bus, said method comprising:

receiving from the bus by the storage component one of a security disable command and a security erase command and an associated password therewith;

determining if an enhanced security bit is set in the enhanced security mode;

if the enhanced security bit is set, determining a security state in which the storage component is operating in the enhanced security mode;

if the storage component is determined to be operating in a predetermined state, comparing the received password with a preset password; and disabling the enhanced security mode if the received and set passwords match.

18. The method of claim 17 including if the enhanced security bit is not set in the enhanced security mode, aborting the received command and sending a predetermined status code over the bus to the host processor.

19. The method of claim 17 including if the enhanced security bit is set in the enhanced security mode and the storage component is determined not to be operating in the predetermined state, aborting the received command and sending a predetermined status code over the bus to the host processor.

20. The method of claim 17 including if the enhanced security bit is set in the enhanced security mode, the storage component is determined to be operating in the predetermined state, but the received and preset passwords do not match, aborting the received command and sending a predetermined status code over the bus to the host processor.

\* \* \* \* \*